(12) United States Patent
Teflioudi et al.

(10) Patent No.: US 12,164,519 B2
(45) Date of Patent: Dec. 10, 2024

(54) RESULT STREAMING BY REORDERING PIPELINES

(71) Applicant: SAP SE, Walldorf (DE)

(72) Inventors: Christina Teflioudi, Heidelberg (DE); Paul Willems, Heidelberg (DE); Till Merker, Sandhausen (DE)

(73) Assignee: SAP SE, Walldorf (DE)

( * ) Notice: Subject to any disclaimer, the term of this patent is extended or adjusted under 35 U.S.C. 154(b) by 0 days.

(21) Appl. No.: 18/302,242

(22) Filed: Apr. 18, 2023

(65) Prior Publication Data
US 2024/0320220 A1    Sep. 26, 2024

Related U.S. Application Data

(60) Provisional application No. 63/491,591, filed on Mar. 22, 2023.

(51) Int. Cl.
*G06F 16/2453* (2019.01)
*G06F 16/2455* (2019.01)

(52) U.S. Cl.
CPC .. *G06F 16/24545* (2019.01); *G06F 16/24568* (2019.01)

(58) Field of Classification Search
CPC ......... G06F 16/24524; G06F 16/24542; G06F 16/24568; G06F 2201/86
USPC .......................................................... 707/713
See application file for complete search history.

(56) References Cited

U.S. PATENT DOCUMENTS

| | | | |
|---|---|---|---|
| 5,619,692 A * | 4/1997 | Malkemus | G06F 16/24542 |
| 9,697,262 B2 * | 7/2017 | Chandramouli | G06F 16/2477 |
| 2015/0248461 A1 * | 9/2015 | Theeten | G06F 16/24524 |
| | | | 707/718 |

* cited by examiner

*Primary Examiner* — Hung T Vy
(74) *Attorney, Agent, or Firm* — Mintz Levin Cohn Ferris Glovsky and Popeo, P.C.

(57) ABSTRACT

In some example embodiments, there is provided a method that includes receiving a query for query plan generation and query plan optimization; detecting whether the query plan includes a restart pipeline, the restart pipeline including one or more first operators that cause a query plan restart; detecting whether the query plan includes a result pipeline, the result pipeline including one or more second operators that provide result streaming; determining whether there is a dependency between execution of the restart pipeline and execution of the result pipeline; in response to determining there is no dependency, reordering the restart pipeline in the query plan such that the restart pipeline will be executed before the result pipeline in order to enable result streaming optimization; and providing the reordered query plan for execution. Related systems and computer program products are also provided.

20 Claims, 7 Drawing Sheets

RESULT STREAMING BY REORDERING PIPELINES

CROSS-REFERENCE TO RELATED APPLICATIONS

This application claims priority under 35 U.S.C. § 119 (e) to, U.S. Provisional Application No. 63/491,591, filed Mar. 22, 2023, titled "IMPROVING RESULT STREAMING BY REORDERING PIPELINES," the subject matter of which is hereby incorporated by reference in its entirety.

TECHNICAL FIELD

The subject matter described herein relates generally to database processing and more specifically to database query optimization.

BACKGROUND

A database may be configured to store an organized collection of data. For example, data held in a relational database may be organized in accordance with a schema defining one or more relations, each of which being a set of tuples sharing one or more common attributes. The tuples of a relation may occupy the rows of a database table while the columns of the database table may store the values of the common attributes shared by the tuples. Moreover, one or more attributes may serve as keys that establish and identify relationships between the relations occupying different database tables. The database may support a variety of database operations for accessing the data stored in the database. For instance, the database may support transactional processing (e.g., on-line transactional processing (OLTP)) that modifies the data stored in the database. Alternatively and/or additionally, the database may support analytical processing (e.g., on-line analytical processing (OLAP)) that evaluates the data stored in the database.

SUMMARY

Systems, methods, and articles of manufacture, including computer program products, are provided for query optimization that improves result streaming reordering. In some example embodiments, there is provided a system that includes at least one processor and at least one memory. The at least one memory may include program code that provides operations when executed by the at least one processor. The operations may include: receiving a query for query plan generation and query plan optimization; detecting whether the query plan includes a restart pipeline, the restart pipeline including one or more first operators that cause a query plan restart; detecting whether the query plan includes a result pipeline, the result pipeline including one or more second operators that provide result streaming; determining whether there is a dependency between execution of the restart pipeline and execution of the result pipeline; in response to determining there is no dependency, reordering the restart pipeline in the query plan such that the restart pipeline will be executed before the result pipeline in order to enable result streaming optimization; and providing the reordered query plan for execution.

In some variations, one or more features disclosed herein including the following features can optionally be included in any feasible combination. The operations may further include determining whether there is an exception to the reordering. In response to determining the exception exists, the reordering of the restart pipeline may be inhibited and the query plan without the reordering may be provided. In response to determining the exception is not present, the reordering of the restart pipeline may be performing and the reordered query plan. The determining whether the exception exists may further include determining that the received query is a query requesting a predetermined quantity of query results. The received query may include a top k values of the result set. The detecting of whether the query plan includes the restart pipeline may further include using at least one of a list, a hint, or metadata indicating that a pipeline is the restart pipeline. The detecting of whether the query plan includes the result pipeline may further include using at least one of a list, a hint, or metadata indicating that a pipeline is the result pipeline. The determining the dependency between execution of the restart pipeline and execution of the result pipeline may further include determining whether the result pipeline uses as an input an output of the restart pipeline. When the result pipeline does not use as input the output of the restart pipeline, there is no dependency.

Implementations of the current subject matter can include, but are not limited to, methods consistent with the descriptions provided herein as well as articles that comprise a tangibly embodied machine-readable medium operable to cause one or more machines (e.g., computers, etc.) to result in operations implementing one or more of the described features. Similarly, computer systems are also described that may include one or more processors and one or more memories coupled to the one or more processors. A memory, which can include a non-transitory computer-readable or machine-readable storage medium, may include, encode, store, or the like one or more programs that cause one or more processors to perform one or more of the operations described herein. Computer implemented methods consistent with one or more implementations of the current subject matter can be implemented by one or more data processors residing in a single computing system or multiple computing systems. Such multiple computing systems can be connected and can exchange data and/or commands or other instructions or the like via one or more connections, including, for example, to a connection over a network (e.g. the Internet, a wireless wide area network, a local area network, a wide area network, a wired network, or the like), via a direct connection between one or more of the multiple computing systems, etc.

The details of one or more variations of the subject matter described herein are set forth in the accompanying drawings and the description below. Other features and advantages of the subject matter described herein will be apparent from the description and drawings, and from the claims. While certain features of the currently disclosed subject matter are described for illustrative purposes in relation to the allocation of worker threads to resume execution of a query execution plan, it should be readily understood that such features are not intended to be limiting. The claims that follow this disclosure are intended to define the scope of the protected subject matter.

DESCRIPTION OF DRAWINGS

The accompanying drawings, which are incorporated in and constitute a part of this specification, show certain aspects of the subject matter disclosed herein and, together with the description, help explain some of the principles associated with the disclosed implementations. In the drawings.

When practical, similar reference numbers denote similar structures, features, or elements.

DETAILED DESCRIPTION

An in-memory relational database may utilize main memory for the primary storage of database tables. For example, the in-memory relational database may be implemented as a column-oriented database (or a columnar database) that stores data from database tables by columns instead of by rows. In the case of the in-memory column-oriented relational database for example, each tuple of a relation may correspond to a record occupying one row of a database table while the columns of the database table may store the values of the common attributes shared by multiple tuples, such that the values occupying each column of the database table (which may span multiple rows (or records) of the database table) may be stored sequentially in one or more data pages, with each data page storing at least a portion of a column. The in-memory column-oriented relational database may support efficient data compression and partitioning for massively parallel processing. Because the in-memory database is directly accessible by the central processing unit (CPU) of the computing engine, transactions accessing the in-memory database may be executed to provide near-instantaneous results.

The throughput and storage capacity of a database, such as an in-memory column-oriented relational database, may be maximized by distributing the processing and storage of data across multiple computing nodes. A single database table may therefore be divided into multiple partitions (or internal tables), for example, through one or more of hash partitioning, round-robin partitioning, and range partitioning, and stored across multiple computing nodes. Doing so may maximize opportunities for parallelization in which a single query is divided into multiple tasks and assigned to individual worker threads for parallel execution. As used herein, the term "worker thread" may refer to a thread or thread of execution, which is a sequence of instructions managed independently by a scheduler. Individual worker threads (e.g., the corresponding sequences of instructions) may be scheduled for sequential execution and/or parallel execution by one or multiple central processing units (CPUs).

In a parallelization framework, a database execution engine may divide a query accessing a dataset (e.g., including one or more database tables) into a quantity of tasks determined based on the quantity of time required to execute the query on a portion the dataset having a predetermined size. As such, if a large quantity of time is required to execute the query on the portion of the dataset, the database execution engine may determine that the query is computationally intensive and thus divide the query into a larger quantity of smaller tasks. Meanwhile, the quantity of worker threads allocated to execute the query may be determined based on the progress of the query observed at various time intervals. For instance, upon allocating an initial quantity of worker threads to perform the tasks associated with the query, the database execution engine may monitor the progress of the query (e.g., the quantity of tasks that have not been performed by any worker threads, the quantity of tasks that have been performed relative to the total quantity of outstanding tasks, and/or the like) to determine whether to increase that initial quantity of worker threads.

In addition to parallelization, the database execution engine may also implement result streaming to support use cases that do not require all of the results of a query at once. With result streaming, the database execution engine may respond to a query by generating a portion of the result, which includes sufficient data for responding to a current fetch call and some additional data for buffering (e.g., in main memory) in anticipation of a future fetch call. The worker threads allocated to generate the portion of the result may be paused in between fetch calls, for example, by allowing these worker threads to sleep on a semaphore. In the event a subsequent fetch call requires more than the buffered data, the database execution engine may wake up the paused worker threads to continue performing the remaining tasks associated with the query. Thus, result streaming may provide optimization by not requiring an operations of a query to operate on all of the data at once.

Furthermore, the database execution engine (which may also be referred to as a query execution engine or an execution engine, for short) may use pipelining. In the case of pipelining, the database execution engine breaks up chunks of data into smaller chunks of data, such that each smaller chunk of data can be processed by a series of one or more operators. The operators refer to low-level operators, such as code that performs a specific operation during operator execution rather than a high-level relational algebra operator. For example, the low-level operator may implement a lock on a database table, perform an index scan, perform a table scan at a given database, and/or the like.

The operators may be connected with each other to form a directed acyclic graph (DAG). Operators with no outgoing links may split the DAG up into multiple pipelines. For example, a pipeline ends on an operator with no outgoing links and starts with an operator after the previous pipeline ended. Moreover, pipeline execution may be performed in a recurrent fashion, such that operator "n" takes a chunk of data as input, performs its operation ("n") on the input data, and then operator "n" pushes its corresponding output to the next operator "n+1". After the last operator in the pipeline is done performing its operation, control is returned to a prior operator. For example, when operator n+1 is finished, execution control returns to prior operator n. The operator n may (or may not) continue processing (for example, producing another piece of data and pushing it down the pipeline of operators, performing a cleanup task, freeing resources, and/or the like). In other words, the pipeline represents a set of data processing elements (e.g., operators) connected in series, such that the output of one element of the pipeline is the input of the next element of the pipeline, and buffer storage may be used between the elements. In some instances, the elements of a pipeline can be executed in parallel or in time-sliced fashion.

As noted, the database execution engine may perform query execution by using result streaming. For example, the query execution may be divided into multiple phases (or, e.g., calls) during which the customer or client requests data produced by the query in smaller data chunks (or parts). Thus, with result streaming, query execution tries to avoid processing all of the data at once. Instead, a portion of the data is processed, so that enough data is processed to satisfy a client request or call (first response to client/customer) and if more requests are issued from the client/customer, more data is processed; but if the client/customer is only interested in only a portion of the results (e.g., a first result), data processing can stop at that point.

During execution of certain operations during query execution, a query restart may occur. A query restart may be used when a feature is missing, if the performance of the database execution engine is known to be bad (e.g., by the database execution engine or a query optimizer). When a query restart occurs, the database execution engine may restart and recompile the query, so that a different database execution engine can be used. Alternatively, or additionally, a query restart may be used in a query execution plan (or query plan for short) if the query execution plan is optimized for a specific data property for example, but the data property has changed so the query should be recompiled to use a different query plan. To illustrate with an example, the query plan for a given query may use an index for evaluating a filter predicate. But if the index in this example is dropped or no longer used, the existing query plan should not or cannot be used. Here, the database execution engine (or query optimizer) may detect that the index is no longer present, so a query restart should be used to force a new query plan to be compiled. In these examples, the query restart (also referred to as query plan restart) generates compilation of a new query plan and thus should be performed before query results are returned to a client/customer.

The database execution engine (or the query optimizer) may detect which operators in for example a pipeline produce results (e.g., as part of result streaming) and which operators cause a query restart. To detect the operators which produce result streaming or a cause a restart, each operator may be inspected. For example, operators that cause a restart may need special functionality which is inherited by a base class. Similarly operators that do result streaming may need to use functionality inherited by another base class. The execution engine inspects from which base classes each operator inherits functionality and thus execution engine inspects can tell if an operator can possibly cause result streaming or restarts. A pipeline that causes a query restart is referred to herein as a restart pipeline, and a pipeline that produces a result, such as in the case of result streaming, is referred to herein a results pipeline.

With result streamlining, results, as noted, cannot be returned to the client/customer until after processing the last pipeline that contains an operator that might cause a query restart. As such, any pipeline that produces results that appears in the query execution before the last restart pipeline needs to process all its data and store it in a buffer, from which the data can later be retrieved and provided to the client/customer. In this way, the result streaming is inhibited by the existence of a query restart pipeline. As noted, the pipeline represents a set of data processing operators that are connected in series, such that the output of an operator of the pipeline is the input of the next operator of the pipeline.

Suppose an initial order of the pipelines (each of which includes one or more operators as noted) are in the following order:

RestartPipeline1, RestartPipeline2, ResultProducingPipeline1, Pipeline3, RestartPipeline4, ResultProducingPipeline2.

In the initial example, the last pipeline with a query restart is "RestartPipeline4." As such, the pipelines up to and including RestartPipeline4 have to process all of their data and store possible results in a buffer so that the query restart can recompile the query plan. In this example, all of the data of ResultProducingPipeline1 and Pipeline 3 is processed and buffered, so the benefits of using result streaming is lost and has no effect for the noted ResultProducingPipeline1. In this example, the first pipeline that can take advantage of result streaming is ResultProducingPipeline2 as there are no subsequent restart pipelines.

In some embodiments, the database execution engine may perform reordering of pipelines to improve the use of result streaming. Referring to the previous example, the database execution engine may detect that the RestartPipeline4 does not depend on the execution of the execution of ResultProducingPipeline1 and Pipeline3. For example, the database execution engine (or query optimizer) detects that the RestartPipeline4 does not need the output of the ResultProducingPipeline1 and the Pipeline3. When this is the case, the database execution engine (or query optimizer) may reorder the restart pipeline(s) earlier in the execution. For example, the pipelines may be reordered as follows:

RestartPipeline1, RestartPipeline2, RestartPipeline4, ResultProducingPipeline1, Pipeline3, ResultProducingPipeline2.

The reordering example moves the RestartPipeline4 so that it is earlier in the query plan. As such, the first pipeline that can partially process its data (as part of the partial results of result streaming) is ResultProducingPipeline1. In other words, as there is no query restart in the query plan after the ResultProducingPipeline1, ResultProducingPipeline1 can operate using result streaming rather than operating using all of its data as in the example before the reordering of ResultProducingPipeline1.

Likewise, if RestartPipeline4 does not depend on ResultProducingPipeline1 but depends on Pipeline3 and Pipeline3 also does not depend on ResultProducingPipeline1, the same effect may be achieved by moving Pipeline3 and RestartPipeline4 as a group to an earlier position (and thus have the ResultProducingPipeline1 later in the query plan) as follows:

RestartPipeline1, RestartPipeline2, Pipeline3, RestartPipeline4, ResultProducingPipeline1, ResultProducingPipeline2.

The database execution engine (or query optimizer) may include one or more exception rules that define when reordering pipelines may not provide query optimization. In the case of a query that defines an early exit in the execution such as produce k rows in a select top k query, the pipeline reordering to an earlier position may not yield an optimization. Referring to the initial query pipeline example above, if while executing ResultProducingPipeline1 there is an early exit (e.g. produce k rows in a select-top-k query), processing can stop so execution of the subsequent pipelines is not needed (e.g., Pipeline3, RestartPipeline4, ResultProducingPipeline2). In this example, reordering the pipelines so that the ResultProducingPipeline1 (which results in an early exit) is executed later in the query plan and after the restart pipeline (as shown the in the examples above) is not needed or optimum.

Figure 1:
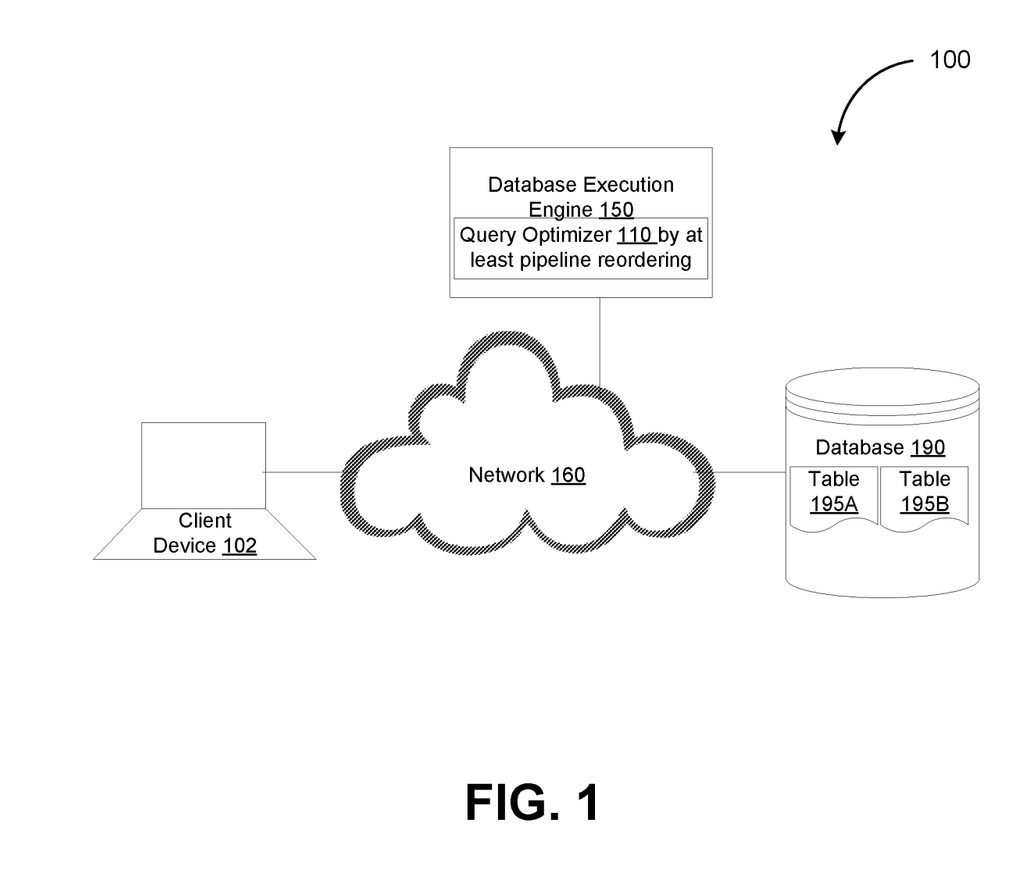
FIG. 1 depicts a system diagram illustrating an example of a database system including a query optimizer for pipeline reordering, in accordance with some example embodiments.

FIG. 1 depicts a system diagram illustrating an example of a database system 100, in accordance with some example embodiments. Referring to FIG. 1, the database system 100 may include one or more client devices such as client device 102, a database execution engine 150, and one or more databases, such as database 190. As shown in FIG. 1, the one or more client devices 102, the database execution engine 150, and the one or more databases 190 may be communicative coupled via a network 160. The database execution engine 150 may include query optimizer 110 which may reorder certain pipelines including one or more restart pipelines and one or more results streaming pipelines.

The one or more databases 190 may include a variety of relational database technologies including, for example, an in-memory database, a column-based database, a row-based database, hybrid database (e.g., combination of column and row based), and/or the like. The one or more client devices 102 may include processor-based devices including, for example, a mobile device, a wearable apparatus, a personal computer, a workstation, an Internet-of-Things (IoT) appliance, and/or the like. The network 140 may be a wired network and/or wireless network including, for example, a public land mobile network (PLMN), a local area network (LAN), a virtual local area network (VLAN), a wide area network (WAN), the Internet, and/or the like.

Figure 2:
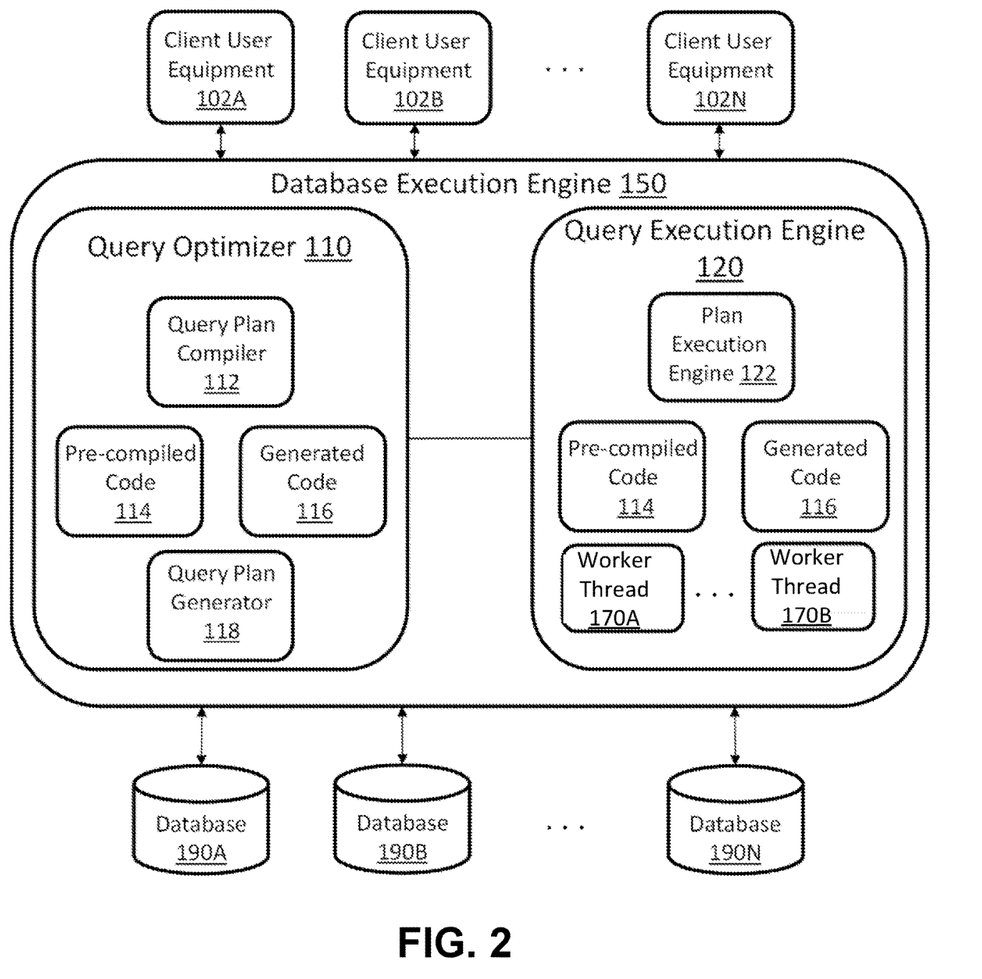
FIG. 2 depicts a block diagram illustrating an example of a database execution engine including a query optimizer for pipeline reordering, in accordance with some example embodiments.

FIG. 2 depicts a block diagram illustrating an example of the database execution engine 150, in accordance with some example embodiments. As shown in FIG. 2, the one or more databases 190, which may include a first database 190A, a second database 190B, and a third database 190C, can represent the database layer of a database management system (DBMS) where data may be persisted and/or stored in a structured way, and where the data may be queried or operated on using operations such as SQL commands or other types of commands/instructions to provide reads, writes, and/or perform other operations. To illustrate by way of an example, the one or more client devices 102, which may include the client devices (e.g., user equipment) 102A-N, may send a query via the database execution engine 150 to the database layer including the one or more databases 190, which may represent a persistence and/or storage layer where database tables may be stored and/or queried. The query may be sent via a connection, such as a wired connection and/or wireless connection (e.g., the Internet, cellular links, WiFi links, and/or the like) provided, for example, by the network 160.

Referring again to FIG. 2, the database execution engine 150 may include a query optimizer 110, such as a SQL optimizer and/or another type of optimizer, to receive at least one query from the one or more client devices 102 and generate a corresponding query plan (which may be optimized) for execution by a query execution engine 120. The query optimizer 110 may receive a request, such as a query, and then form or propose an optimized query plan. The query plan (which may be optimized) may be represented as a so-called "query algebra" or "relational algebra." The query plan may propose an optimum query plan with respect to, for example, the execution time of the overall query. To optimize a query, the query plan optimizer 110 may obtain one or more costs for the different ways the execution of the query plan may be performed, and the costs may be in terms of execution time at, for example, the one or more databases 190.

In some embodiments, the query optimizer 110 may optimize a query plan using pipeline reordering, such that certain pipelines (which include one or more restart pipelines and one or more results streaming pipelines) are reordered so that the partial data results benefits of the results streamlining can be realized (and thus not be eliminated by a query restart in a restart pipeline).

A query plan compiler 112 may enable compilation of at least a portion of the query plan. The query plan compiler 112 may compile the optimized query algebra into operations, such as program code and/or any other type of command, operation, object, or instruction. This code may include pre-compiled code 114 (which may be pre-compiled and stored and then selected for certain operations in the query plan) and/or generated code 116 generated specifically for execution of the query plan. For example, the query plan compiler 112 may select pre-compiled code 114 for a given operation as part of the optimization of the query plan, while for another operation in the query plan the query plan compiler 112 may allow a compiler to generate the code (i.e., generated code 116). The pre-compiled code 114 and the generated code 116 represent code for executing the query plan, and this code may be provided to a query plan generator 118, which interfaces with the query execution engine 120.

The query optimizer 110 may optimize the query plan (which may include the noted pipelines of operators) by compiling and generating code. Moreover, the query optimizer 110 may optimize the query plan to enable pipelining during execution. The query execution engine 120 may receive, from the query plan generator 118, compiled code to enable execution of the optimized query plan, although the query execution engine 120 may also receive code or other commands directly from a higher-level application or another source such as the one or more client devices 102. The pre-compiled code 114 and/or the generated code 116 may be provided to a plan execution engine 122 of the query execution engine 120. The plan execution engine 122 may then prepare the plan for execution, and this query plan may include the pre-compiled code 114 and/or the generated code 116. When the code for the query plan is ready for execution during runtime, the query execution engine 120 may step through the code, performing some of the operations within the database execution engine 150 and sending some of the operations (or commands in support of an operation, such as a read, write, and/or the like) for execution at one or more of one or more database 190A-N.

The query execution engine 120 may, as noted, be configured to handle different types of databases and the corresponding persistent layers and/or tables therein. For example, the one or more databases 190 may include at least one row-oriented database, in which case an insert is performed by adding a row with a corresponding row identifier. Alternatively and/or additionally, where the one or more databases 190A-N include one or more column store databases, which may use dictionaries and compressive techniques when inserting data into a table. Where the database layer includes multiple different types of databases, the query execution engine 120 may perform execution related to handling the differences between different types of databases such as row-oriented databases and column store databases. This may enable a reduction in processing at the database layer, for example, at each of the one or more databases 190A-N. Moreover, the query execution engine 120 may perform other operations including rule-based operations, such as joins and projections, as well as filtering, group by, multidimensional analysis, and/or the like to reduce the processing burden on the database layer. In this way, the query execution engine 120 may execute these and other complex operations, while the one or more databases 190A-N can perform simpler operations to reduce the processing burden at the one or more databases 190A-N.

The query execution engine 120 may run, as noted above, the generated code 116 generated for some query operations, while the pre-compiled code 114 may be run for other operations. Moreover, the query execution engine 120 may combine the generated code 116 with the pre-compiled code 114 to further optimize execution of query related operations. In addition, the query execution engine 120 may provide for a plan execution framework that is able to handle data chunk(s), pipelining, and state management during query execution. Furthermore, the query execution engine 120 may provide the ability to access table storage via an abstract interface to a table adapter, which may reduce dependencies on specific types of storage/persistence layers (which may enable use with different types of storage/persistence layers).

Figure 3:
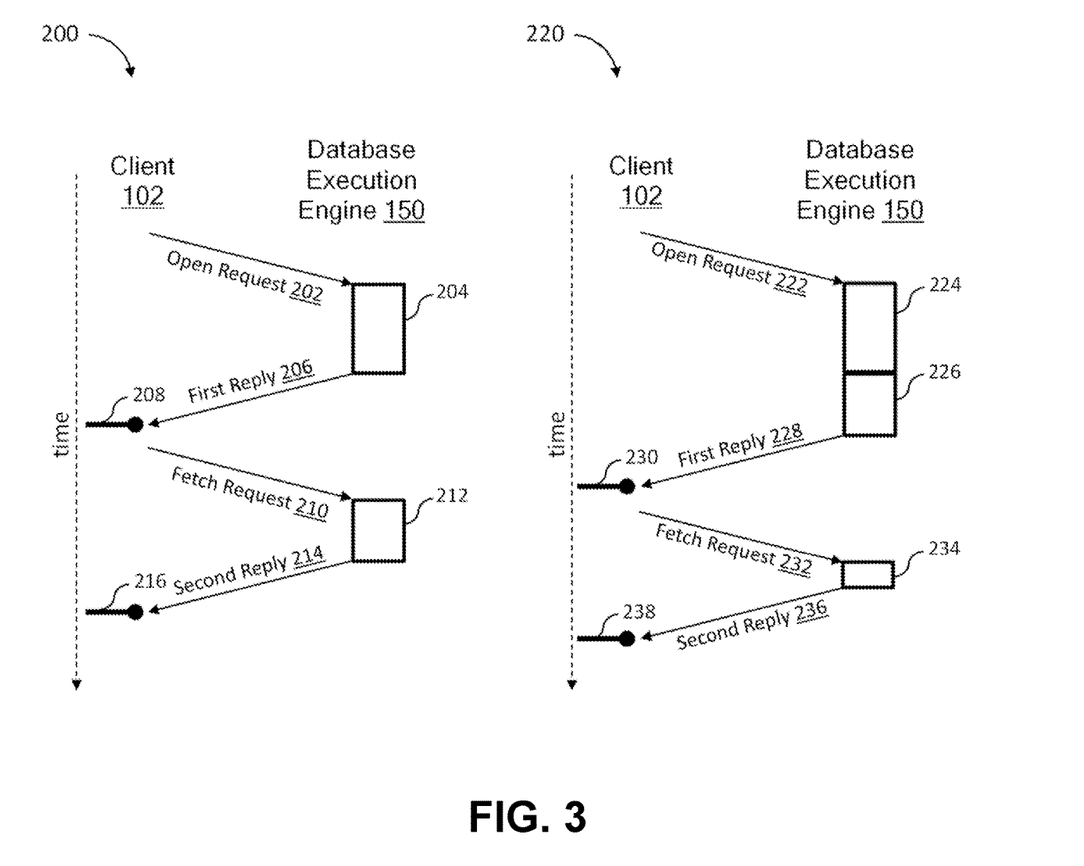
FIG. 3 depicts a schematic diagram illustrating an example of result streaming, in accordance with some example embodiments.

The database layer may provide distributed data storage in which the processing and storage of data is distributed across multiple nodes including, for example, the first database 190A, the second database 190B, the third database 190C, and/or the like. Accordingly, to store a database table 195 at the one or more databases 190, the database execution engine 150 may divide the database table 195 into multiple partitions by applying one or more of a hash partitioning, round-robin partitioning, and range partitioning. For example, as shown in FIG. 3, the database table 195 may be divided into a first partition 165a, a second partition 165b, and a third partition 165c. Moreover, the first partition 165a may be stored at the first database 190A, the second partition 165b may be stored at the second database 190B, and the third partition 165c may be stored at the third database 190C. Alternatively, or additionally, the databases 190A, B, and/or C may include a separate query optimizer and/or query execution engine.

To execute a query accessing a dataset that includes, for example, the database table 195A and/or B (FIG. 1), the database execution engine 150 may divide the query into a quantity of tasks determined based on the quantity of time required to execute the query on a portion the dataset having a predetermined size. Accordingly, if a large quantity of time is required to execute the query on the portion of the dataset, the database execution engine 150 may determine that the query is computationally intensive and thus divide the query into a larger quantity of smaller tasks (or operators). One or more of the worker threads 170 (e.g., a first worker thread 170A, a second worker thread 170B, and/or the like) may be allocated to perform the tasks associated with the query.

As noted, the database execution engine 150 may also implement result streaming to support use cases that do not require all of the results of a query at once. With result streaming, the database execution engine 150 may respond to a query by generating a portion of the result that includes sufficient data for responding to the current fetch call and some additional data for buffering (e.g., in main memory) in anticipation of a future fetch call. The one or more worker threads 170A-B allocated to generate the portion of the result may be paused in between fetch calls, for example, by allowing the one or more worker threads 170 to complete their respective tasks before going to sleep on a semaphore. Upon receiving a subsequent fetch call that requires more than the buffered data, the database execution engine 150 may wake up the paused worker threads 170A-B to continue performing the remaining tasks associated with the query. As used herein, the term "fetch call" may refer to a particular type of request that form a part of a query requesting data from the one or more databases 190. For example, the database execution engine 150 may receive, from the client device 102, an open request to initiate the query. Following the initial open request, the database execution engine 150 may receive one or more subsequent fetch calls, each of which requesting at least a portion of the results of the query. That is, a single fetch call may request, from the database execution engine 150, at least a portion of the results associated with the query. The database execution engine 150 may continue to receive fetch calls until the client device 102 sends a request to close the query, which may occur when some or all of the results of the query are provided to the client device 102.

To further illustrate, FIG. 3 depicts schematic diagram illustrating an example of result streaming, in accordance with some example embodiments. FIG. 3 illustrates aspects related to the pause operation with the sequence 200 corresponding to the pause operation and the sequence 220 corresponding to a standard data request query and execution, with emphasize on the timing differences provided by the pause operation. With reference to the sequence 200, an open request 202 is sent by the client device 102 to the database execution engine 150. In response to the open request 202, the database execution engine 150 compiles a first subset or batch of results 204. The first subset of results 204 are sent to the client device 102 in a first reply 206, which are received by the client device 102 at a first time 208. During this time, the database execution engine 150 waits for a subsequent fetch request without utilizing additional resources. The client device 102 may later send a fetch request 210. In response to the fetch request 210, the database execution engine 150 compiles a second subset or batch of results 212. The second subset of results 212 are sent to the client device 102 in a second reply 214, received by the client device 102 at a second time 216. As noted, additional fetch requests from the client device 102 and results from the database execution engine 150 may be incorporated.

Comparing the sequence 200 of the pause operation consistent with implementations of the current subject matter, sequence 220 illustrates a standard data request query sent from the client device 102 to the database execution engine 150. An open request 222 is sent to and received by the database execution engine 150. The database execution engine 150 computes a full query result that includes, for example, a first subset of results 204 to satisfy the open request 222 and a second subset of results 226 to satisfy subsequent fetch requests. The first subset of results 224 are sent to the client device 102 in a first reply 228, which are received by the client device 102 at a first time 230. The client device 102 may later send a fetch request 232. In response to the fetch request 232, the database execution engine 150 obtains the second subset of results 226 from a shared memory buffer 234 (where 234 represents an amount of time needed to copy the second subset of results 226 from the shared memory buffer). The second subset of results 226 are sent to the client device 102 in a second reply 236, received by the client device 102 at a second time 238. As noted, additional fetch requests from the client device 102 and results from the database execution engine 150 may be incorporated.

The first times 208 and 230 thus are the times at which the first subset of results to satisfy the user query are received using the pause operation and a standard operation, respectively. As can be seen in FIG. 3, the pause operation (sequence 200) provides the first subset of results 204 in a shorter amount of time than that provided by the standard operation (220). Additionally, the pause operation provides the second subset of results 212 in a shorter amount of time than that provided by the standard operation. Moreover, the total amount of time to receive the full query result is less using the pause operation.

Although the database execution engine 150 may realize significant savings in computational resources (e.g., memory and processor power consumption) by implementing result streaming such that the results of a query are generated on a piecemeal and as-needed basis, those savings may be negated (as noted above) if query restarts in a pipeline require a query result pipeline to save all of its data to enable the recompile of the query restart.

In some embodiments, the database execution engine 150 may detect whether a pipeline (and/or one or more operators of the pipeline) can cause a query restart (also referred to herein as a restart pipeline) or whether a pipeline (and/or one or more operators of the pipeline) can produce result streamlining (also referred to herein as results pipeline). For example, the database execution engine may detect from a query plan including pipelines of operators whether there is a restart pipeline or a result pipeline present.

In some embodiments, the database execution engine 150 may detect whether there are dependencies between the restart pipeline and the result pipeline. As noted above, if there are no dependencies between the restart pipeline and the result pipeline, the database execution engine may consider optimization by reordering the result pipeline so that it executes after a restart pipeline. In this way, the benefits of results streaming can be realized by the result pipeline. To determine whether there are dependencies, the database execution engine 150 may derive or determine the dependency from an analysis of the data that each pipeline uses (e.g., does a pipeline use as an input the output of another pipeline) or from an analysis of metadata about the dependencies between operators. Alternatively, or additionally, explicit declarations of moveable pipelines may be used to assess dependency in the case that the pipeline dependencies are known (and thus declared) by the developer of the pipeline operators.

Figure 4A:
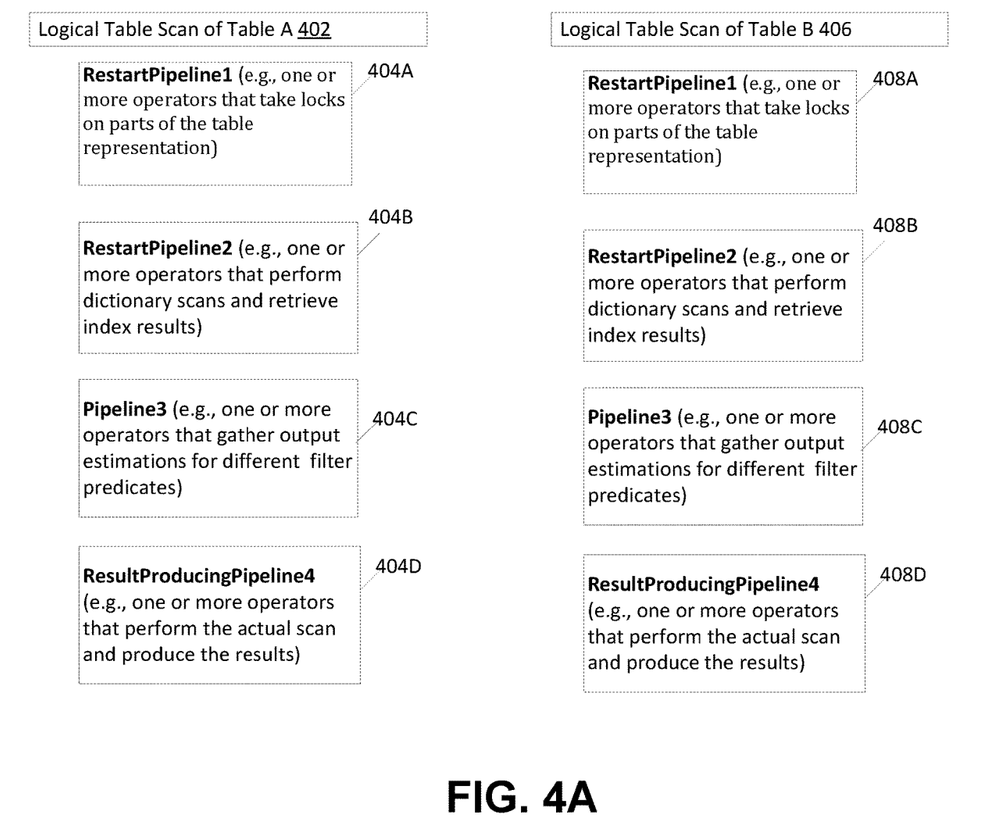
FIGS. 4A and 4B depict examples of pipelines, in accordance with some example embodiments.

FIG. 4A depicts an example a portion of a query plan for a logical table scan of table A 402 and a logical table scan of table B 406, in accordance with some embodiments. The database execution engine 150 (or query optimizer 110) may generate the portion of the query plan from the logical table scan 402. The logical table scan operator 402 of the query plan may be implemented with low level physical operations using 4 pipelines 404A-D.

The first pipeline is RestartPipeline1 404A. The RestartPipeline1 includes one or more operators that take or perform locks a table, such as table 195A, being scanned (e.g., read). The database execution engine detects RestartPipeline1 is a restart pipeline, so the database execution may force a new query plan to be compiled as noted above. For example, the database execution may have a list, a hint, or metadata indicating that the pipeline or low-level operators of pipeline 404A require a query restart.

The second pipeline is RestartPipeline2 404B. The RestartPipeline2 includes one or more low-level operators that perform dictionary scans and retrieve index results to enable the table scan of the table, such as the table 195A being scanned (e.g., read). Like RestartPipeline1 404A, the database execution engine 150 detects RestartPipeline2 is a restart pipeline, so the database execution may force a new query plan to be compiled as noted above. For example, the database execution may have a list, a hint, or metadata indicating that the pipeline or low-level operators of pipeline 404B require a query restart.

The third pipeline is a Pipeline3 404C. The Pipeline3 includes one or more low-level operators that gather output estimations for the different filter predicates.

The fourth pipeline is ResultProducingPipeline4 404D. The ResultProducingPipeline4 includes one or more low-level operators that operators that perform the actual scan and produce the results of the table scan of the table, such as the table 195A being scanned (e.g., read). In other words, the table scan can use results streaming to provide partial results of the scan. In this example, the database execution engine 150 detects ResultProducingPipeline4 is a result streaming pipeline (also referred to a results pipeline), so the results pipeline can provide optimization by generating a portion of the result. For example, the database execution may have a list, a hint, or metadata indicating that the pipeline or low-level operators of pipeline 404D are a result streaming pipeline.

FIG. 4A also depicts, as noted, the four pipelines 408A-D from the logical table scan of table B 406, such as table 195B.

In the example of FIG. 4A, the database execution engine 150 may also detect that there is a dependency between at least the RestartPipeline1 404A and RestartPipeline2 404B. For example, RestartPipeline1 404A has to be executed before RestartPipeline2 404B (e.g., the locks should be in place before the scans and index retrieval). Likewise, the RestartPipeline1 408A has to be executed before RestartPipeline2 408B. The database execution engine may also detect there is no dependency between the first pipeline group for table scan A 402 (RestartPipeline1 404A, RestartPipeline2 404B, and Pipeline3 404C) and the second pipeline group for table scan B 406 (RestartPipeline1 408A, RestartPipeline2 408B, and Pipeline3 408C). In this example, the database execution 150 (or for example the query optimizer 110) detects that whenever the query plan has a logical table scan as shown at FIG. 4A, the first 3 physical pipelines can be marked (or indicated) as pipelines which can be reordered to provide optimization by moving the first 3 physical pipelines 404A-C and 408A-C to the start of the pipeline execution. The database execution engine (or for example the query optimizer 110) may also determine that at the end of the query plan building phase, if there is no early exit (or restart) pipeline earlier, these pipelines may be moved to an earlier position.

To illustrate further, the database execution engine 150 (or query optimizer 110) may be building or optimizing a query plan from a query received from a client device. The query may be for example, "select * from tableA union all (select* from tableB)". In this example, the original pipeline execution may be as shown at 466A at FIG. 4B. But as there are no dependencies between the pipelines for tableA and tableB, the database execution engine may rearrange the pipelines as shown at 466B at FIG. 4B.

Figure 4B:
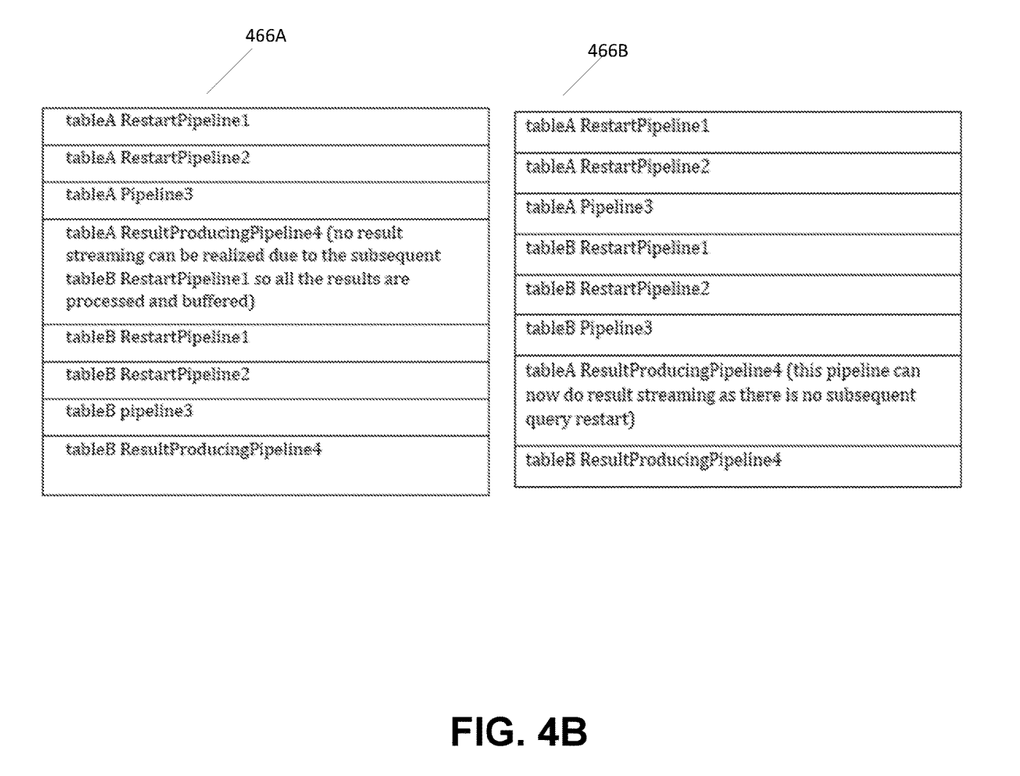
Figure 4C:
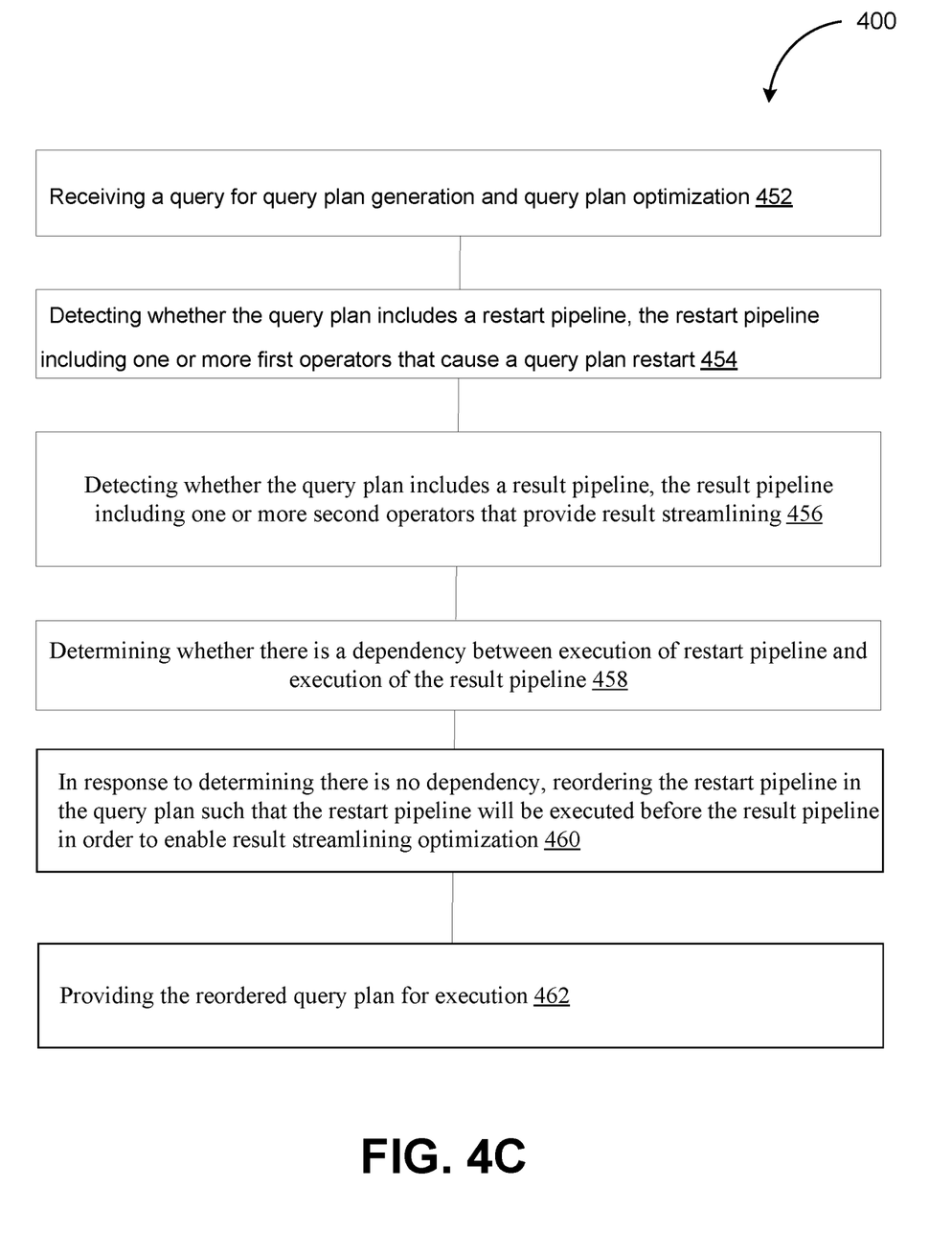
FIG. 4C depicts an example of a process flow for reordering pipelines, in accordance with some example embodiments.

FIG. 4C depicts a flowchart illustrating an example of a process 400 for reordering pipelines, in accordance with some example embodiments. Referring to FIGS. 1-4A, B, and C, the process 400 may be performed by the database execution engine 150 in order to execute a query accessing for example one or more database tables, such as database tables 195A-B stored at one or more databases. Although some of the examples refer to the database execution engine (or for example the query optimizer), other engines or optimizers may also perform one or more aspects of process 400.

At 452, the database execution engine 150 may receive a query for query plan generation and/or query plan optimization, in accordance with some embodiments. For example, the database execution engine 150 may receive from a client device, such as client user equipment 102A, a query. An example of a query may be a database query, such as "select * from tableA", "select * from tableA union all (select* from tableB)", and other types of queries of a database management system. As the query plan is generated, the database execution engine may generated query plan, a portion of which may include one or more pipelines of low-level operations to execute at least a portion of the received query at a given database. These pipelines may provide optimization of the execution of the query at a given database. For example, database execution engine may generate pipelines as depicted at FIGS. 4A-4B.

To build or optimize the query plan which includes pipelines, the database execution engine may detect, at 454, whether the query plan includes a restart pipeline, in accordance with some embodiments. The restart pipeline includes one or more first operators that cause a query plan restart. As noted, the database execution engine may know which pipelines (or the low-level operators in a pipeline) cause a query restart. Moreover, the database execution engine may mark or indicate which pipelines are restart pipelines. Referring to the initial example above, the pipelines include restart pipelines: RestartPipeline1, RestartPipeline2, ResultProducingPipeline1, Pipeline3, RestartPipeline4, ResultProducingPipeline2.

At 456, the database execution engine may detect whether the query plan includes a result pipeline, in accordance with some embodiments. The result pipeline includes one or more second operators that provide result streamlining and, as noted, provide optimization benefits during execution of the query plan. Referring again to the initial example above, the pipelines include restart pipelines: RestartPipeline1, RestartPipeline2, ResultProducingPipeline1, Pipeline3, RestartPipeline4, ResultProducingPipeline2.

At 458, the database execution engine 150 may detect whether there is a dependency between execution of the restart pipeline and execution of the result pipeline, in accordance with some embodiments. For example, if the restart pipeline does not need to results of the execution of the result pipeline, there is no dependency between execution of the restart pipeline and execution of the result pipeline.

In response to determining there is no dependency, the database execution engine may, at 460, reorder the restart pipeline in the query plan such that the restart pipeline will be executed before the result pipeline in order to enable result streamlining optimization. Referring to the example above, the RestartPipeline4 is moved in the query plan before ResultProducingPipeline1, so the order is as follows: RestartPipeline1, RestartPipeline2, RestartPipeline4, ResultProducingPipeline1, Pipeline3, ResultProducingPipeline2. In this way, the result pipeline can perform result streaming using partial results as noted above.

When the reordering is performed, the reordered query plan is provided for execution, in accordance with some embodiments. For example, the reordered query plan may be provided to a query execution engine 120 for execution at one or more of the databases 190A-C. Alternatively, or additionally, the reordered query plan may be provided one or more of the databases, which can then execute a query based on the reordered query plan.

As noted above, there may be one or more exceptions which when present may indicate there is no need to reorder. For example, if an early exit query is received, such as select top k results and/or the like, the reordering may not provide optimization so the database execution engine may inhibit the reordering when the exception is present.

Figure 5:
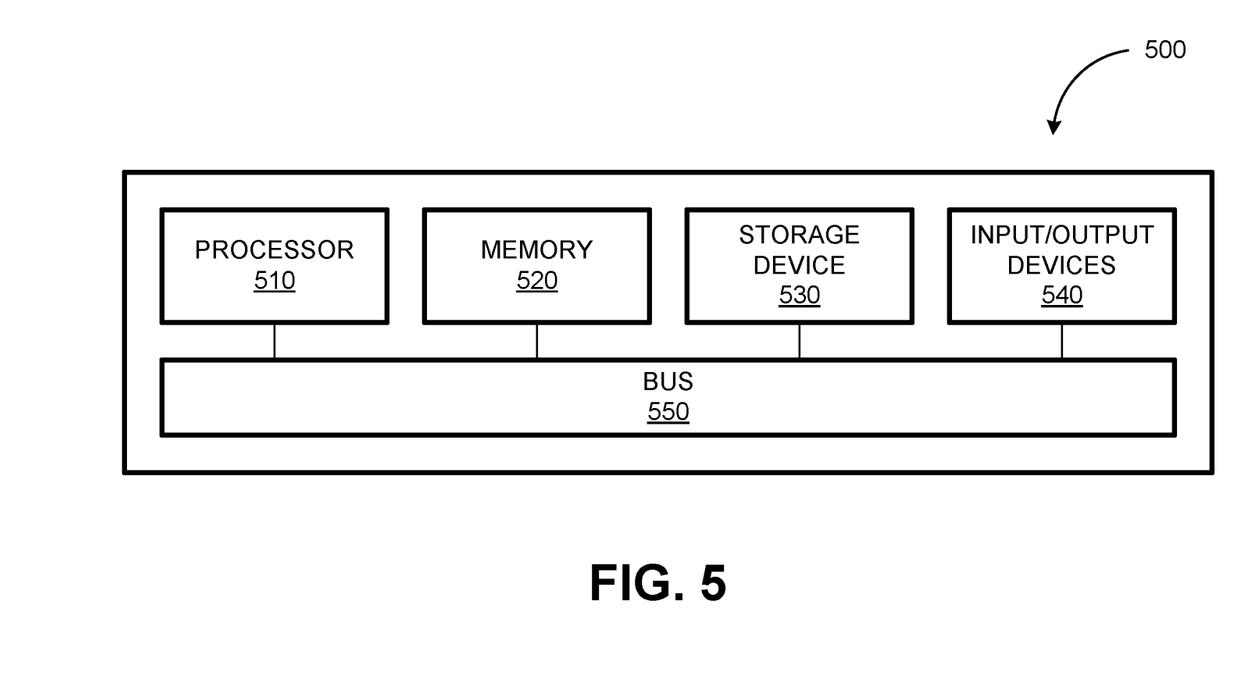
FIG. 5 depicts a block diagram illustrating an example of a computing system, in accordance with some example embodiments.

FIG. 5 depicts a block diagram illustrating an example of a computing system 500 consistent with implementations of the current subject matter. Referring to FIGS. 1-5, the computing system 500 may implement the database execution engine 150 and/or any components therein.

As shown in FIG. 5, the computing system 500 can include a processor 510, a memory 520, a storage device 530, and input/output device 540. The processor 510, the memory 520, the storage device 530, and the input/output device 540 can be interconnected via a system bus 550. The processor 510 is capable of processing instructions for execution within the computing system 500. Such executed instructions can implement one or more components of, for example, the database execution engine 150. In some implementations of the current subject matter, the processor 510 can be a single-threaded processor. Alternately, the processor 510 can be a multi-threaded processor. The processor 510 is capable of processing instructions stored in the memory 520 and/or on the storage device 530 to display graphical information for a user interface provided via the input/output device 540.

The memory 520 is a computer readable medium such as volatile or non-volatile that stores information within the computing system 500. The memory 520 can store data structures representing configuration object databases, for example. The storage device 530 is capable of providing persistent storage for the computing system 500. The storage device 530 can be a floppy disk device, a hard disk device, an optical disk device, or a tape device, or other suitable persistent storage means. The input/output device 540 provides input/output operations for the computing system 500. In some implementations of the current subject matter, the input/output device 540 includes a keyboard and/or pointing device. In various implementations, the input/output device 540 includes a display unit for displaying graphical user interfaces.

According to some implementations of the current subject matter, the input/output device 540 can provide input/output operations for a network device. For example, the input/output device 540 can include Ethernet ports or other networking ports to communicate with one or more wired and/or wireless networks (e.g., a local area network (LAN), a wide area network (WAN), the Internet).

In some implementations of the current subject matter, the computing system 500 can be used to execute various interactive computer software applications that can be used for organization, analysis and/or storage of data in various (e.g., tabular) format (e.g., Microsoft Excel®, and/or any other type of software). Alternatively, the computing system 500 can be used to execute any type of software applications. These applications can be used to perform various functionalities, e.g., planning functionalities (e.g., generating, managing, editing of spreadsheet documents, word processing documents, and/or any other objects, etc.), computing functionalities, communications functionalities, etc. The applications can include various add-in functionalities or can be standalone computing products and/or functionalities. Upon activation within the applications, the functionalities can be used to generate the user interface provided via the input/output device 540. The user interface can be generated and presented to a user by the computing system 500 (e.g., on a computer screen monitor, etc.).

One or more aspects or features of the subject matter described herein can be realized in digital electronic circuitry, integrated circuitry, specially designed ASICs, field programmable gate arrays (FPGAs) computer hardware, firmware, software, and/or combinations thereof. These various aspects or features can include implementation in one or more computer programs that are executable and/or interpretable on a programmable system including at least one programmable processor, which can be special or general purpose, coupled to receive data and instructions from, and to transmit data and instructions to, a storage system, at least one input device, and at least one output device. The programmable system or computing system may include clients and servers. A client and server are generally remote from each other and typically interact through a communication network. The relationship of client and server arises by virtue of computer programs running on the respective computers and having a client-server relationship to each other.

These computer programs, which can also be referred to as programs, software, software applications, applications, components, or code, include machine instructions for a programmable processor, and can be implemented in a high-level procedural and/or object-oriented programming language, and/or in assembly/machine language. As used herein, the term "machine-readable medium" refers to any computer program product, apparatus and/or device, such as for example magnetic discs, optical disks, memory, and Programmable Logic Devices (PLDs), used to provide machine instructions and/or data to a programmable processor, including a machine-readable medium that receives machine instructions as a machine-readable signal. The term "machine-readable signal" refers to any signal used to provide machine instructions and/or data to a programmable processor. The machine-readable medium can store such machine instructions non-transitorily, such as for example as would a non-transient solid-state memory or a magnetic hard drive or any equivalent storage medium. The machine-readable medium can alternatively or additionally store such machine instructions in a transient manner, such as for example, as would a processor cache or other random access memory associated with one or more physical processor cores.

To provide for interaction with a user, one or more aspects or features of the subject matter described herein can be implemented on a computer having a display device, such as for example a cathode ray tube (CRT) or a liquid crystal display (LCD) or a light emitting diode (LED) monitor for displaying information to the user and a keyboard and a pointing device, such as for example a mouse or a trackball, by which the user may provide input to the computer. Other kinds of devices can be used to provide for interaction with a user as well. For example, feedback provided to the user can be any form of sensory feedback, such as for example visual feedback, auditory feedback, or tactile feedback; and input from the user may be received in any form, including acoustic, speech, or tactile input. Other possible input devices include touch screens or other touch-sensitive devices such as single or multi-point resistive or capacitive track pads, voice recognition hardware and software, optical scanners, optical pointers, digital image capture devices and associated interpretation software, and the like.

In the descriptions above and in the claims, phrases such as "at least one of" or "one or more of" may occur followed by a conjunctive list of elements or features. The term "and/or" may also occur in a list of two or more elements or features. Unless otherwise implicitly or explicitly contradicted by the context in which it used, such a phrase is intended to mean any of the listed elements or features individually or any of the recited elements or features in combination with any of the other recited elements or features. For example, the phrases "at least one of A and B;" "one or more of A and B;" and "A and/or B" are each intended to mean "A alone, B alone, or A and B together." A similar interpretation is also intended for lists including three or more items. For example, the phrases "at least one of A, B, and C;" "one or more of A, B, and C;" and "A, B, and/or C" are each intended to mean "A alone, B alone, C alone, A and B together, A and C together, B and C together, or A and B and C together." Use of the term "based on," above and in the claims is intended to mean, "based at least in part on," such that an unrecited feature or element is also permissible.

In view of the above-described implementations of subject matter this application discloses the following list of examples, wherein one feature of an example in isolation or more than one feature of said example taken in combination and, optionally, in combination with one or more features of one or more further examples are further examples also falling within the disclosure of this application:

Example 1: A system, comprising: at least one data processor; and at least one memory storing instructions which, when executed by the at least one data processor, cause operations comprising: receiving a query for query plan generation and query plan optimization; detecting whether the query plan includes a restart pipeline, the restart pipeline including one or more first operators that cause a query plan restart; detecting whether the query plan includes a result pipeline, the result pipeline including one or more second operators that provide result streaming; determining whether there is a dependency between execution of the restart pipeline and execution of the result pipeline; in response to determining there is no dependency, reordering the restart pipeline in the query plan such that the restart pipeline will be executed before the result pipeline in order to enable result streaming optimization; and providing the reordered query plan for execution.

Example 2: The system of Example 1, wherein the operations further comprise: determining whether there is an exception to the reordering.

Example 3: The system of any of Examples 1-2 further comprising: in response to determining the exception exists, inhibiting the reordering of the restart pipeline and providing the query plan without the reordering.

Example 4: The system of any of Examples 1-3 further comprising:
  in response to determining the exception is not present, performing the reordering of the restart pipeline and providing the reordered query plan.

Example 5: The system of any of Examples 1-4, wherein the determining whether the exception exists further comprises determining that the received query is a query requesting a predetermined quantity of query results.

Example 6: The system of any of Examples 1-5, wherein the received query comprises a top k values of the result set.

Example 7: The system of any of Examples 1-6, wherein the detecting of whether the query plan includes the restart pipeline further comprises using at least one of a list, a hint, or metadata indicating that a pipeline is the restart pipeline.

Example 8: The system of any of Examples 1-7, wherein the detecting of whether the query plan includes the result pipeline further comprises using at least one of a list, a hint, or metadata indicating that a pipeline is the result pipeline.

Example 9: The system of any of Examples 1-8, wherein determining the dependency between execution of the restart pipeline and execution of the result pipeline further comprises determining whether the result pipeline uses as an input an output of the restart pipeline.

Example 10: The system of any of Examples 1-9, wherein when the result pipeline does not use as the input the output of the restart pipeline, there is no dependency.

Example 11: A method, comprising: receiving a query for query plan generation and query plan optimization; detecting whether the query plan includes a restart pipeline, the restart pipeline including one or more first operators that cause a query plan restart; detecting whether the query plan includes a result pipeline, the result pipeline including one or more second operators that provide result streaming; determining whether there is a dependency between execution of the restart pipeline and execution of the result pipeline; in response to determining there is no dependency, reordering the restart pipeline in the query plan such that the restart pipeline will be executed before the result pipeline in order to enable result streaming optimization; and providing the reordered query plan for execution.

Example 12: The method of Example 11, wherein the operations further comprise: determining whether there is an exception to the reordering.

Example 13: The method of any of Examples 11-12 further comprising: in response to determining the exception exists, inhibiting the reordering of the restart pipeline and providing the query plan without the reordering.

Example 14: The method of any of Examples 11-14 further comprising: in response to determining the exception is not present, performing the reordering of the restart pipeline and providing the reordered query plan.

Example 15: The method of any of Examples 11-14, wherein the determining whether the exception exists further comprises determining that the received query is a query requesting a predetermined quantity of query results.

Example 16: The method of any of Examples 11-15, wherein the received query comprises a top k values of the result set.

Example 17: The method of any of Examples 11-16, wherein the detecting of whether the query plan includes the restart pipeline further comprises using at least one of a list, a hint, or metadata indicating that a pipeline is the restart pipeline.

Example 18: The method of any of Examples 11-17, wherein the detecting of whether the query plan includes the result pipeline further comprises using at least one of a list, a hint, or metadata indicating that a pipeline is the result pipeline.

Example 19: The method of any of Examples 11-18, wherein determining the dependency between execution of the restart pipeline and execution of the result pipeline further comprises determining whether the result pipeline uses as an input an output of the restart pipeline.

Example 20: A non-transitory computer-readable storage medium including instructions which, when executed by at least one data processor, cause operations comprising: receiving a query for query plan generation and query plan optimization; detecting whether the query plan includes a restart pipeline, the restart pipeline including one or more first operators that cause a query plan restart; detecting whether the query plan includes a result pipeline, the result pipeline including one or more second operators that provide result streaming; determining whether there is a dependency between execution of the restart pipeline and execution of the result pipeline; in response to determining there is no dependency, reordering the restart pipeline in the query plan such that the restart pipeline will be executed before the result pipeline in order to enable result streaming optimization; and providing the reordered query plan for execution.

The subject matter described herein can be embodied in systems, apparatus, methods, and/or articles depending on the desired configuration. The implementations set forth in the foregoing description do not represent all implementations consistent with the subject matter described herein. Instead, they are merely some examples consistent with aspects related to the described subject matter. Although a few variations have been described in detail above, other modifications or additions are possible. In particular, further features and/or variations can be provided in addition to those set forth herein. For example, the implementations described above can be directed to various combinations and subcombinations of the disclosed features and/or combinations and subcombinations of several further features disclosed above. In addition, the logic flows depicted in the accompanying figures and/or described herein do not necessarily require the particular order shown, or sequential order, to achieve desirable results. Other implementations may be within the scope of the following claims.

What is claimed is:

1. A system, comprising:
   at least one data processor; and
   at least one memory storing instructions which, when executed by the at least one data processor, cause operations comprising:
   receiving a query for generation of a query plan and optimization of the query plan;
   detecting that the query plan includes a restart pipeline, the restart pipeline including one or more first operators that cause a query plan restart that causes a recompile of the restart pipeline;
   detecting that the query plan includes a result pipeline, the result pipeline including one or more second operators that provide result streaming that is configured to enable partial results to be obtained for the one or more second operators;
   determining whether there is a dependency between execution of the restart pipeline and execution of the result pipeline;
   in response to determining there is no dependency, reordering the restart pipeline in the query plan such that the restart pipeline will be executed before the result pipeline in order to enable result streaming optimization; and
   providing the reordered query plan for execution.

2. The system of claim 1, wherein the operations further comprise:
   determining whether there is an exception to the reordering.

3. The system of claim 2 further comprising:
   in response to determining the exception exists, inhibiting the reordering of the restart pipeline and providing the query plan without the reordering.

4. The system of claim 2 further comprising:
   in response to determining the exception is not present, performing the reordering of the restart pipeline and providing the reordered query plan.

5. The system of claim 2, wherein the determining whether the exception exists further comprises determining that the received query is a query requesting a predetermined quantity of query results.

6. The system of claim 2, wherein the received query comprises a top k values of the result set.

7. The system of claim 1, wherein the detecting of whether the query plan includes the restart pipeline further comprises using at least one of a list, a hint, or metadata indicating that a pipeline is the restart pipeline.

8. The system of claim 1, wherein the detecting of whether the query plan includes the result pipeline further comprises using at least one of a list, a hint, or metadata indicating that a pipeline is the result pipeline.

9. The system of claim 1, wherein determining the dependency between execution of the restart pipeline and execution of the result pipeline further comprises determining whether the result pipeline uses, as an input, an output of the restart pipeline.

10. The system of claim 9, wherein when the result pipeline does not use as the input the output of the restart pipeline, there is no dependency.

11. A method, comprising:
receiving a query for generation of a query plan and optimization of the query plan;
detecting that the query plan includes a restart pipeline, the restart pipeline including one or more first operators that cause a query plan restart that causes a recompile of the restart pipeline;
detecting that the query plan includes a result pipeline, the result pipeline including one or more second operators that provide result streaming that is configured to enable partial results to be obtained for the one or more second operators;
determining whether there is a dependency between execution of the restart pipeline and execution of the result pipeline;
in response to determining there is no dependency, reordering the restart pipeline in the query plan such that the restart pipeline will be executed before the result pipeline in order to enable result streaming optimization; and
providing the reordered query plan for execution.

12. The method of claim 11, wherein the operations further comprise:
determining whether there is an exception to the reordering.

13. The method of claim 12 further comprising:
in response to determining the exception exists, inhibiting the reordering of the restart pipeline and providing the query plan without the reordering.

14. The method of claim 12 further comprising:
in response to determining the exception is not present, performing the reordering of the restart pipeline and providing the reordered query plan.

15. The method of claim 12, wherein the determining whether the exception exists further comprises determining that the received query is a query requesting a predetermined quantity of query results.

16. The method of claim 12, wherein the received query comprises a top k values of the result set.

17. The method of claim 11, wherein the detecting of whether the query plan includes the restart pipeline further comprises using at least one of a list, a hint, or metadata indicating that a pipeline is the restart pipeline.

18. The method of claim 11, wherein the detecting of whether the query plan includes the result pipeline further comprises using at least one of a list, a hint, or metadata indicating that a pipeline is the result pipeline.

19. The method of claim 11, wherein determining the dependency between execution of the restart pipeline and execution of the result pipeline further comprises determining whether the result pipeline uses, as an input, an output of the restart pipeline.

20. A non-transitory computer-readable storage medium including instructions which, when executed by at least one data processor, cause operations comprising:
receiving a query for generation of a query plan and optimization of the query plan;
detecting that the query plan includes a restart pipeline, the restart pipeline including one or more first operators that cause a query plan restart that causes a recompile of the restart pipeline;
detecting that the query plan includes a result pipeline, the result pipeline including one or more second operators that provide result streaming that is configured to enable partial results to be obtained for the one or more second operators;
determining whether there is a dependency between execution of the restart pipeline and execution of the result pipeline;
in response to determining there is no dependency, reordering the restart pipeline in the query plan such that the restart pipeline will be executed before the result pipeline in order to enable result streaming optimization; and
providing the reordered query plan for execution.

* * * * *